United States Patent [19]

Skoultchi et al.

[11] 4,054,480
[45] Oct. 18, 1977

[54] ANAEROBIC ADHESIVE AND SEALANT COMPOSITIONS CONTAINING ALPHA-HYDROXYSULFONE

[75] Inventors: Martin M. Skoultchi, Somerset; Dilip K. Ray-Chaudhuri, Somerville; William J. Catena, Passaic, all of N.J.

[73] Assignee: National Starch and Chemical Corporation, Bridgewater, N.J.

[21] Appl. No.: 579,782

[22] Filed: May 22, 1975

[51] Int. Cl.² .................. C09J 5/04; C08F 3/62; C08F 18/00; C08F 2/00
[52] U.S. Cl. .................. 156/331; 156/310; 156/332; 260/31.8 R; 260/47 UA; 260/63 UY; 260/77.5 AP; 260/77.5 AN; 526/205; 526/209; 526/211; 526/320; 526/328
[58] Field of Search ............ 156/310, 327, 331, 332; 260/31.8 R, 47 UA, 63 UY, 77.5 AP, 77.5 AN, 78.4 N, 78.5 UA, 78.5 BB, 80.3 R, 80.3 L, 80.3 E, 80.72, 80.73, 80.75, 80.76, 80.81, 85.5 D, 85.5 A, 85.5 ES, 86.1 R, 86.1 E, 86.1 N, 86.7, 88.3 A, 88.7 A, 88.7 D, 88.7 B, 89.5 R, 89.5 A, 89.5 N; 526/320, 211, 205, 209

[56] References Cited

U.S. PATENT DOCUMENTS

| 3,435,012 | 3/1969 | Nordlander | 156/332 |
|---|---|---|---|
| 3,591,438 | 7/1971 | Toback et al. | 156/310 |
| 3,616,040 | 10/1971 | Toback | 156/310 |
| 3,658,624 | 4/1972 | Lees | 156/332 |
| 3,775,385 | 11/1973 | Ozono et al. | 260/89.5 A |
| 3,837,963 | 9/1974 | Fravenglas et al. | 260/89.5 R |
| 3,853,827 | 12/1974 | Klatil et al. | 260/86.1 E |
| 3,855,040 | 12/1974 | Malofsky | 260/89.5 A |
| 3,880,956 | 4/1975 | Skoultchi | 260/89.5 R |

FOREIGN PATENT DOCUMENTS 7,248,264   5/1972   Japan

OTHER PUBLICATIONS

Die Makromolekulare Chemie vol. 12, (1954), Bredereck et al. pp. 100–109.
Journal of Polymer Science, vol. XIX pp. 311–321 (1956), Braver et al.

*Primary Examiner*—Herbert J. Lilling
*Attorney, Agent, or Firm*—Edwin Szala; Ellen T. Dec

[57] ABSTRACT

Anaerobic curing compositions useful as anaerobic adhesives and sealants are described. These compositions comprise mixtures of polymerizable acrylic and substituted acrylic monomers together with a catalyst comprising an alpha-hydroxy sulfone compound. As an alternate embodiment of the invention, certain organic peroxides may be added to the composition to further prolong the shelf life thereof and to increase the shear strength of the resulting adhesive bond.

13 Claims, No Drawings

ANAEROBIC ADHESIVE AND SEALANT COMPOSITIONS CONTAINING ALPHA-HYDROXYSULFONE

BACKGROUND OF THE INVENTION

I. Field of the Invention

This invention relates to anaerobic curing compositions utilizing polymerizable acrylic and substituted acrylic monomers together with an alpha-hydroxy sulfone catalyst to effect latent polymerization of the acrylic monomers. The compositions are stable for periods of time extending to a half-year or more in the presence of air or oxygen, but cure rapidly when placed between air or oxygen impermeable surfaces such as metal, glass, etc. thereby finding use as anaerobic adhesives and sealants. Further, the addition of certain dialkyl peroxides to these novel compositions has been found to result in an adhesive having substantially increased shear strength and longer shelf life.

II. Brief Description of the Prior Art

Anaerobic curing compositions are known and well described in the prior art. U.S. Pat. No. 2,628,178 issued Feb. 10, 1953 describes the preparation of anaerobic curing compositions which rely on the oxygenation of certain monomers until at least 0.1% of active oxygen is introduced into the monomer. The oxygenated monomer remains stable until polymerization is initiated by the absence of air. Another patent, U.S. Pat. No. 2,895,950 issued July 21, 1959, describes compositions containing defined polymerizable polyacrylate ester monomers together with hydroperoxide catalysts. Later patents dealing with anaerobic curing sealants disclose the use of stabilizers, accelerators, etc. in conjunction with peroxide, perester or hydroperoxide catalysts. Recently, U.S. Pat. No. 3,775,385 as well as U.S. Pat. No. 3,880,956 assigned to the assignee of the present application, have disclosed alternate catalysts which do not require the presence of the peroxidic class of compounds.

The use of alpha-hydroxy sulfones as accelerators for peroxides in redox systems has been described, however, there has heretofore been no indication that these sulfones would function without the necessity of peroxides as satisfactory catalysts for the curing of acrylic monomeric compositions in an anaerobic environment.

SUMMARY OF THE INVENTION

It has now been found that anaerobic curing compositions characterized in possessing an extended shelf life of a half-year or more in the presence of air or oxygen together with the ability to polymerize or set-up rapidly when excluded from air or oxygen can be formed from a mixture of a polymerizable acrylic or substituted acrylic monomer together with 0.05–5.0% by weight of the monomer, of an alpha-hydroxy sulfone catalyst. These compositions are particularly useful in the anaerobic bonding of adjacent or closely facing surfaces at least one of which may be metal, for example, the mating threads of a nut and bolt.

Moreover, it has also been found that the addition to these novel anaerobic curing compositions of 0.1 to 10% by weight of the total formulation of a dialkyl peroxide as an optional component will result in a marked increase in the shear strength of the resultant bond although its use is not necessary for the operation of this invention. Additionally, the use of the dialkyl peroxides will increase the shelf life of the compositions to one year or more without affecting the ability of the adhesive to cure rapidly when air and oxygen are excluded.

DESCRIPTION OF PREFERRED EMBODIMENTS

One class of polymerizable monomers useful in the present compositions correspond to the general formula:

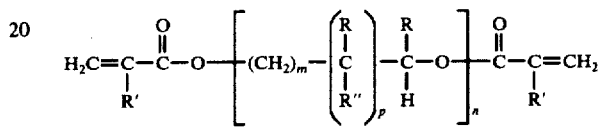

wherein R is selected from the group consisting of hydrogen, methyl, ethyl,

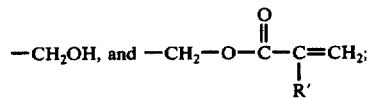

R' is selected from the group consisting of hydrogen, chlorine, methyl and ethyl;

R" is selected from the group consisting of hydrogen, hydroxy, and

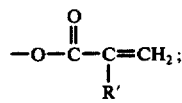

$m$ is an integer equal to at least 1, e.g., from 1 to 8 or higher and preferably from 1 to 4 inclusive;

$n$ is an integer equal to at least 1, e.g., from 1 to 20 or more; and $p$ is one of the following: 0 or 1.

Monomers useful in this invention and which come within the above general formula include, for example, ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, and other polyether diacrylates and dimethacrylates.

The above class of monomers is in essence described in U.S. Pat. No. 3,043,820 issued July 10, 1962 (to R. H. Krieble).

A second class of polymerizable monomers useful in the present compositions correspond to the general formula:

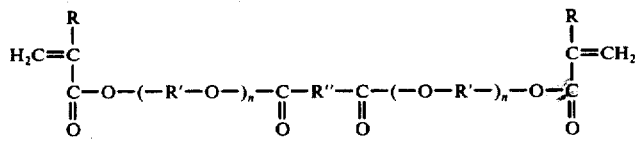

where
R represents hydrogen, chlorine, methyl or ethyl,
R' represents alkylene with 2–6 carbon atoms,
R" represents $(CH_2)_m$ in which $m$ is an integer of from 0 to 8,

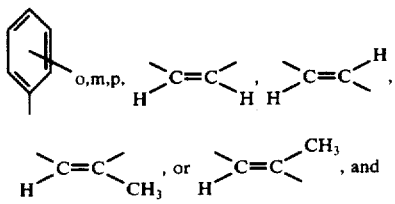

ene diisocyanate, with an acrylate ester containing a hydroxy or amino group in the non-acrylate portion thereof, for example, hydroxyethyl methacrylate. A preferred monomer representative of this class is prepared from the reaction of 2 moles toluene diisocyanate, 1 mole poly(propylene glycol) and 2 moles hydroxyethyl acrylate.

The above class of monomers is in essence described in U.S. Pat. No. 3,425,988 issued Feb. 4, 1969 (Loctite Corporation).

Another class of monomers useful in the present application are the mono- and polyacrylate and methacrylate esters of bisphenol type compounds. These monomers may be described by the formula:

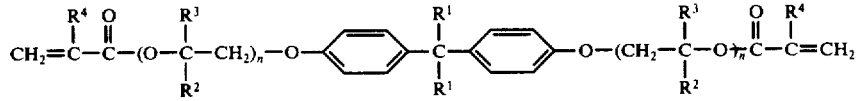

$n$ represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) malonate, dimethacrylate of bis(tetraethylene glycol) sebacate, dimethacrylate of bis(ethylene glycol) phthalate, dimethacrylates of bis(tetraethylene glycol) maleate, and the diacrylates and α-chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanate-hydroxyacrylate or isocyanate-aminoacrylate reaction products which may be characterized as acrylate terminated polyurethanes and polyureides or polyureas. These monomers correspond to the general formula:

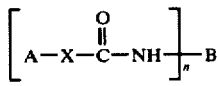

wherein X is selected from the group consisting of —O— and

and R is a member selected from the group consisting of hydrogen and lower alkyl of 1 to 7 carbon atoms; A represents the organic residue of an active hydrogen containing acrylic ester wherein the active hydrogen has been removed, the ester being hydroxy or amino substituted on the alkyl portion thereof and the methyl, ethyl and chlorine homologs thereof; $n$ is an integer from 1 to 6 inclusive; and B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluwhere $R^1$ is methyl, ethyl, carboxyl or hydrogen; $R^2$ is hydrogen, methyl or ethyl; $R^3$ is hydrogen, methyl or hydroxyl; $R^4$ is hydrogen, chlorine, methyl or ethyl and $n$ is an integer having a value of 0 to 8.

Representative monomers of the above-described class include: dimethacrylate and diacrylate esters of 4,4′bishydroxyethoxy-bisphenol A; dimethacrylate and diacrylate esters of bisphenol A; etc. These monomers are essentially described in Japanese Patent Publication No. 70-15640 to Toho Chemical Manuf. Ltd.

In addition to the monomers already described, other useful monomers are monofunctional acrylate and methacrylate esters and the hydroxy, amide, cyano, chloro, and silane substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acryalte, n-octyl acrylate, 2-ethylhexyl acrylate, decylmethacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloracrylate, glycidyl acrylate, glycidyl methacrylate, and the like.

The monomers useful herein are seen to be polymerizable monomers having one or more acrylic or substituted acrylic groups as a common, unifying characteristic, and for convenience may be generically termed "acrylic and substituted acrylic monomers", although it is preferred that the acrylic monomer or comonomer employed comprise at least 50% by weight of a methacrylate-base monomer.

In order to produce anaerobic curing compositions characterized by exceptionally high bond strength in the resultant cured polymer, the particular monomer employed may be chosen so as to contain an alcoholic or other relatively polar group substituted thereon. Examples of such polar groups in addition to the hydroxy group include, amino, amido, cyano, carboxy, mercapto and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

It is to be understood that the various monomers useful herein are not required to be in a highly purified state. The monomers may be comprised of commercial grades in which inhibitors, stabilizers, or other additives or impurities may be present, as well as those prepared in the laboratory or in pilot plant scale.

The alpha-hydroxy sulfones useful as catalysts herein are characterized by the formula:

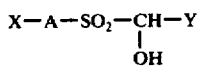

where A is an aliphatic or aromatic radical containing 1 to 18 carbon atoms; X is hydrogen, chlorine, bromine, fluorine, hydroxy, nitro, alkyl ($C_{1-18}$), carboalkoxy ($C_{1-4}$), alkoxy ($C_{1-4}$), aryloxy ($C_{6-10}$) or aryl ($C_{6-10}$); and Y is hydrogen, alkyl ($C_{1-18}$) or ($C_{6-10}$) aryl which may be substituted with chlorine, bromine fluorine, hydroxy, dialkyl amino or alkoxy. Illustrative of the sulfones included within the scope of the invention are p-tolyl-α-hydroxymethyl sulfone, p-tolyl-α-hydroxybenzyl sulfone, phenyl hydroxymethyl sulfone, p-tolyl-α-hydroxy(p'-chlorobenzyl)sulfone, p-tolyl-α-hydroxy(p'-N,N'-dimethylamine)benzyl sulfone, etc. Mixtures of various alpha-hydroxy sulfones may also be employed.

These alpha-hydroxy sulfones are prepared by methods well known in the art which generally comprise the reaction of aliphatic or aromatic aldehydes with aromatic or aliphatic sulfinic acids.

The relative amounts of the alpha-hydroxy sulfones used in the compositions of the present invention should be sufficient to initiate polymerization of the monomer when the composition is placed in an anaerobic environment. Such effective amounts of catalytic components will vary mainly depending on the monomer component of the composition, the structural variations in the catalyst and the particular substrate with which it comes in contact. For most applications, however, the sulfone catalyst is used in amounts of from about 0.05 to 5.0% by weight of the monomer, preferably from about 0.1 to 2%.

The catalysts of the present invention may be used alone in the anaerobic system or an accelerator such as orthosulfobenzimide (saccharin) may be employed in amounts of about 0.05 to 5.0% by weight of the monomer. The addition of saccharin at these levels will tend to reduce the time required to achieve satisfactory "finger-tight" levels.

Additionally, from about 0.1 to 10% by weight of the total formulation, of a dialkyl peroxide of the formula ROOR' may be employed in order to further increase the shelf-life of the adhesive formulation and to increase the shear strength of the bond formed therefrom. Suitable dialkyl peroxides are those in which R and R' are independently hydrocarbon radicals containing up to 18 carbon atoms, preferably up to about 12 carbon atoms. Typically, dicumylperoxide di-t-butylperoxide, 2,5-dimethyl-2,5-di-t-butylperoxyhexane, 2,2-dimethyl-2,5-di-t-butylperoxyhexane, 1,1-bis(t-butylperoxy)-3,3,5-trimethylcyclohexene and 2,2-bis(t-butylperoxy)-4-methylpentane may be utilized.

It is to be further noted that higher levels of catalyst, saccharin or dialkyl peroxide may, of course, be employed; however, no added benefit will be achieved thereby.

Since the catalysts employed herein are generally very soluble in the acrylate and methacrylate-based monomeric systems, it is usually unnecessary to employ a solvent in order to produce a satisfactory sealant composition. If, however, the presence of a solvent is desired, then any solvent which dissolves the alpha-hydroxy sulfone, and any accelerator which may be present, and which is itself soluble in the monomer may be employed. Common solvents are described in the literature and include, for example, alkanols, such as methanol, ethanol and butanol and the substituted or unsubstituted formamides such as formamide and N,N-dimethyl formamide.

In preparing these anaerobic curing compositions, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic, polymerizable comonomer(s) may be added to constitute up to about 60%, by weight, of the monomer composition. Preferably, however, the optional, non-acrylic comonomer will constitute no more than 50%, by weight, of the monomer composition, and most preferably, it will constitute no more than 30%, by weight, of the monomer composition.

Optionally, the compositions may also contain a minor amount, up to 50%, by weight, of a polymeric thickener, for example, a low or high molecular weight polymer or prepolymer. Illustrative of such polymeric thickeners is a commercially available methacrylate polymer sold by E. I. DuPont de Nemours and Company, under the trademark ELVACITE or by Rohm and Haas, under the trademark ACRYLOID, as well as styrene-methylmethacrylate copolymers.

In producing the novel anaerobic curing compositions of the present invention, it may also be desirable to employ conventional antioxidants, thermal stabilizers or free radical inhibitors in order to further prolong the shelf-life of the composition. In particular, it may be preferred to add a sterically hindered phenol, e.g. butylated hydroxytoluene (BHT), butylated hydroxyanisole (BHA), or such stabilizers as are commercially available under the tradenames Ionox220 (Shell), Santonox R (Monsanto), Irganox 1010 and Irganox 1076 (Ciba-Geigy), etc.

In order to further modify the properties of these compositions, there may also be present plasticizers such, for example, as dibutyl phthalate or triethylene glycol and/or tackifying resins such, for example, as styrene/alpha methylstyrene copolymer (Kristalex by Hercules). Other optional ingredients include inorganic thickeners, organic and inorganic fillers, cut glass fibers, as well as visible dyes or ultraviolet fluorescent dyes.

In order to prepare the anaerobic curing compositions of the present invention, it is merely necessary to mix the desired amount of catalyst with the selected acrylic monomer or monomers which may optionally contain non-acrylic copolymerizable monomers. Optional ingredients can be premixed into the monomer or alternatively admixed into the prepared composition.

The curing or polymerization of these compositions is initiated by the absence of air or oxygen either at ambient or elevated temperatures. Compositions containing significant amounts of hydroxy substituted acrylic monomer are further crosslinked by the application of heat thereby resulting in increased bond strength.

Although the compositions of the invention will cure satisfactorily under any set of anaerobic conditions, the presence of selected metals on the surface of the components to be bonded will appreciably increase the rate of curing. Suitable metals which are effective with these anaerobic compositions include iron, copper, tin, aluminum, silver and alloys thereof. The surfaces provided by the metals, alloys and their platings and which are useful in acceleratng curing of these compositions will, for convenience, be grouped into the term "active metal" surfaces and be understood to include but not be limited to all of the metalic entities mentioned above. It is to be further noted that in bonding components which do not comprise these active metals (e.g. plastic, glass, non-active metal surfaces) it may be desirable to accelerate curing by pretreating these surfaces with an active metal compound which is soluble in the monomer-catalyst mixture such as ferric chloride, and cobalt, manganese, lead, copper and iron "soaps" such as cobalt-2-ethyl hexoate, cobalt-2-ethyl butyrate, cobalt naphthenate, cobalt laurate, manganese-2-ethyl hexoate, manganese-2-ethyl butyrate, manganese naphthenate, manganese laurate, lead-2-ethyl hexoate, lead-2-ethyl butyrate, lead naphthenate, lead laurate, etc. and mixtures thereof. These active metal compounds may be readily applied to the surfaces, for example, by wetting the surfaces with a dilute solution of the metal compound in a volatile solvent such as trichloroethylene and then permitting the solvent to evaporate. Non-active surfaces treated in this manner can be bonded together with the sealants of the present invention as quickly as active metal surfaces.

The following examples will further describe and illustrate the practice of this invention but they are not intended to limit its scope. In these examples, the compositions were prepared by mixing the indicated ingredients in amounts given as parts by weight unless otherwise specified.

Table I illustrates the alpha-hydroxy sulfone catalysts of the formula:

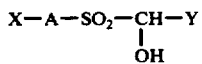

where X and Y have values as indicated. Table IA shows the various monomers used in conjunction with the catalysts of Table I in the examples which follow.

TABLE I

| Catalyst designation in the Examples | Value of X | Value of A | Value of Y |
|---|---|---|---|
| A | H | phenylene | H |
| B | p-CH$_3$ | " | H |
| C | p-CH$_3$ | " | CH$_3$ |
| D | p-CH$_3$ | " | n-C$_3$H$_7$ |
| E | p-CH$_3$ | " | C$_6$H$_5$ |
| F | p-CH$_3$ | " | $\alpha$-C$_{10}$H$_7$ |
| G | p-CH$_3$ | " | p-Cl-C$_6$H$_4$ |

TABLE I-continued

| Catalyst designation in the Examples | Value of X | Value of A | Value of Y |
|---|---|---|---|
| H | p-CH$_3$ | " | p-CH$_3$O-C$_6$H$_4$ |
| I | p-CH$_3$ | " | o-CH$_3$O-C$_6$H$_4$ |
| J | p-CH$_3$ | " | p-N(CH$_3$)$_2$C$_6$H$_4$ |
| K | H | n-C$_8$H$_{16}$ | H |
| L | H | naphthalene | H |
| M | p-Cl | phenylene | H |

TABLE IA

| Monomer designation in the Examples | Monomer |
|---|---|
| AA | Ethyleneglycol dimethacrylate |
| BB | Diethyleneglycol dimethacrylate |
| CC | Tetraethyleneglycol dimethacrylate |
| DD | Hydroxyethyl methacrylate |
| EE | Poly(butylene maleate)dimethacrylate (M.W. 2000) |
| FF | Poly(propylene glycol)dimethacrylate (M.W. 1025) |
| GG | Bis(methacryloxy-2-hydroxypropyl)ether of Bisphenol A |
| HH | Reaction product of 2 moles hydroxyethyl acrylate and 1 mole toluene diisocyanate |
| II | Hydroxyethyl acrylate |

EXAMPLES 1 - 20

These examples illustrate representative anaerobic curing compositions of this invention prepared with a variety of catalysts and monomers. In these examples, the catalyst was dissolved in the monomer and the indicated amount of orthosulfo-benzimide (saccharin), if present, added.

The compositions thus prepared were then evaluated in a "finger-tight" lock test known in the art. About 2 or 3 drops of each composition were placed on the exposed threads of separate ⅜-24 iron bolts (degreased) and immediately thereafter a nut (degreased) with mating threads was run onto the bolt so that the nut was directly in the thread area of the applied composition. Measurements were made of the time-periods necessary with each composition at room temperature to achieve a "finger-tight" lock such that the nut could not be moved on the threads with fingers.

The separate components, amounts and evaluation results are given in Table II.

TABLE II

| Example | Monomer | Catalyst | Saccharin | Minutes to "Finger-tight" |
|---|---|---|---|---|
| 1 | CC | B 0.1% | 0 | 15 |
| 2 | CC | B 0.25 | 0.50% | 12 |
| 3 | CC | B 0.50 | 0.50 | 7 |
| 4 | CC | B 1.00 | 1.00 | 5 |
| 5 | CC | B 2.0 | 0.50 | 5 |
| 6 | CC | C 0.25 | 0.50 | 5 |
| 7 | CC | D 0.25 | 0.50 | 3 |
| 8 | CC | E 0.25 | 0 | 2 |
| 9 | CC | E 0.25 | 0.50 | 1 |
| 10 | CC | K 0.50 | 0.25 | 9 |
| 11 | CC | L 0.5 | 0 | 12 |
| 12 | CC | M 0.5 | 0.25 | 18 |
| 13 | AA | A 0.25 | 0.50 | 13 |
| 14 | DD | F 0.25 | 0.50 | 8 |
| 15 | EE | B 0.50 | 0.50 | 19 |
| 16 | FF | B 0.50 | 2.0 | 10 |
| 17 | BB | B 0.25 | 0.50 | 10 |
| 18 | GG | B 0.25 | 0.50 | 8 |
| 19 | HH | B 0.25 | 0.50 | 4 |
| 20 | Mixture of 55% AA 45% II | B 0.50 | 0.0 | 14 |

EXAMPLES 21 – 28

These examples illustrate the use of a variety of optional components in the production of anaerobic curing compositions of the present invention.

Table III lists the various ingredients which were added to the basic anaerobic formulation of Example 2.

TABLE III

| Additive Designation in the Examples | Additive |
|---|---|
| I | Elvacite 2042 - Polyethyl methacrylate (thickener) |
| II | Butylated hydroxytoluene (stabilizer) |
| III | Di-t-butyl peroxide |
| IV | Auramine base dye (colorant) |
| V | Piccotex 100 (tackifier) |
| VI | Diisodecyl phthalate (plasticizer) |

Table IV shows the anaerobic curing compositions prepared with these optional components and the finger-tight times obtained when these compositions were tested in a manner similar to that described in Example 1 – 20.

TABLE IV

| Example | Additive | (percent) | Finger-tight time |
|---|---|---|---|
| 21 | I | 10% | 11 |
| 22 | III | 7½% | 12 |
| 23 | II | 0.1% | 14 |
| 24 | IV | 0.05% | 16 |
| 25 | V | 5% | 14 |
| 26 | VI | 8% | 13 |
| 27 | I | 10% | 17 |
|    | II | 0.2% | |
|    | III | 10% | |
|    | V | 6% | |
| 28 | I | 7% | 22 |
|    | II | 0.05% | |
|    | III | 5% | |
|    | IV | 0.05% | |
|    | VI | 15% | |

EXAMPLE 29

This example illustrates the effect of the addition of di-t-butyl peroxide on the break-away torque of the hydroxyalkyl sulfone catalyzed anaerobic adhesive system.

The following formulations were prepared and tested as a thread locking adhesive for iron nuts and bolts.

| Ingredients | Sample A | Sample B |
|---|---|---|
| Polyethylene glycol dimethacrylate | 7.9 | 7.9 |
| Hydroxyethyl methacrylate | 1.0 | 1.0 |
| Kristalex 120 | 0.5 | 0.5 |
| Elvacite 2043 | 0.6 | 0.6 |
| p-tolyl hydroxymethyl sulfone | 0.025 | 0.025 |
| Saccharin | 0.03 | 0.03 |
| Di-t-butyl peroxide | 0.30 | — |

In addition to testing to obtain "finger-tight" times, these two compositions were also tested and compared with respect to the bond strengths of the bond between the nut and bolt formed with the composition after curing at room temperature for overnight. The "torque" measurements shown in the table below indicate the amount of torque required for a wrench to remove the nut on the threads initially (break) as well as the average prevailing torque which is calculated by averaging the amount of torque required for the wrench to turn a series of three bolts for ¼ turn, ½ turn, ¾ turn and a full turn.

| Sample | Finger tight time (min) | Break-away torque after 24 hr. cure (in-lb) | Avg. prevailing torque (in-lb) |
|---|---|---|---|
| A | 7 | 150–175 | 385 |
| B | 7 | 50–75 | 327 |

The above results indicate that di-t-butyl peroxide improves both break-away torque and prevailing torque of the alpha-hydroxy sulfone catalyzed anaerobic adhesive systems.

EXAMPLE 30

This example illustrates the effect of the addition of di-t-butyl peroxide on stability at 50° C. of the alpha-hydroxy sulfone catalyzed anaerobic adhesive system.

The following formulations were prepared and tested as thread locking adhesives for iron nuts and bolts using both fresh and aged samples.

| Ingredients | Sample A | Sample B |
|---|---|---|
| Tetraethylene glycol dimethacrylate | 10 | 10 |
| p-tolyl hydroxy methyl sulfone | 0.025 | 0.025 |
| Saccharin | 0.025 | 0.025 |
| Di-t-butyl peroxide | — | 0.3 |

The results of thread locking adhesive tests were as follows:

| Sample | Aged (days at 50°) | Finger-tight (min) | Cure (hour) | Prevailing torque (in-lb) |
|---|---|---|---|---|
| A | 0 | 7–8 | 24 | 150 |
| A | 5 | 5–6 | 24 | 214 |
| A | 11 | 15 | 24 | 219 |
| A | 20 | 20–30 | 24 | 67 |
| B | 0 | 7 | 20 | 273 |
| B | 2 | 6 | 26 | 291 |
| B | 9 | 6–7 | 17 ½ | 248 |
| B | 23 | 5 | 23 ½ | 329 |

The above results indicate that the oven (50° C) stability of the alpha-hydroxy sulfone catalyzed anaerobic adhesive system is significantly improved when di-t-butyl peroxide is added to the system.

Comparable results are achieved when di-t-butyl peroxide is replaced in the formulation with an equal amount of dicumyl peroxide.

EXAMPLE 31

In order to show that the novel adhesives of the present invention will cure under anaerobic conditions on a surface which does not contain an active metal, the adhesive formulation of Example 2 was used to bond two glass slides. A satisfactory bond was obtained after 10 minutes.

As will be recognized to those skilled in the art, the present invention provides anaerobic curing compositions useful as adhesives and sealants which can be prepared in various formulations to provide a range of bond strength, polymerization rates, viscosities and shelf stability. Variations may be made in ingredients, proportions and procedures as long as such variations are within the scope and spirit of the following claims.

We claim:

1. An anaerobic curing composition stable when exposed to air consisting essentially of a mixture of a polymerizable acrylic or substituted acrylic monomer selected from the group consisting of (a)

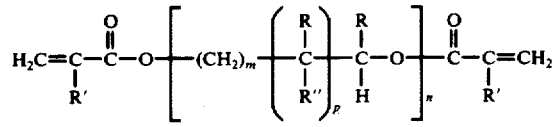

wherein R is selected from the group consisting of hydrogen, methyl, ethyl,

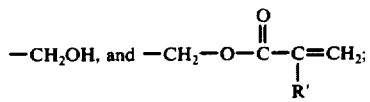

R' is selected from the group consisting of hydrogen, chlorine, methyl and ethyl;
R" is selected from the group consisting of hydrogen, hydroxy,

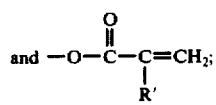

m is an integer from 1 to 8; and n is an integer from 1 to 20; and p is 0 or 1;

(b)

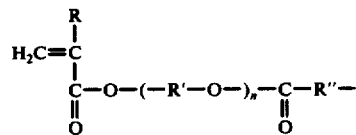

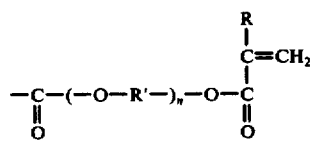

wherein
R represents hydrogen, chlorine, methyl or ethyl,
R' represents alkylene with 2-6 carbon atoms,
R" represents $(CH_2)_m$ in which m is an integer of from 0 to 8,

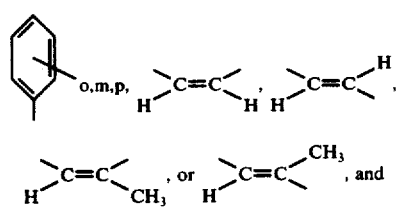

n represents an integer of from 1 to 4;

(c)

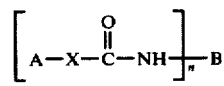

wherein X is selected from the group consisting of —O— and

and R is a member selected from the group consisting of hydrogen and lower alkyl of 1 to 7 carbon atoms, A represents the organic residue of an active hydrogen containing acrylic ester wherein the active hydrogen has been removed, said ester being hydroxy or amino substituted on the alkyl portion thereof, and the methyl, ethyl and chlorine homologs thereof, n is an integer from 1 to 6, and B is a mono- or polyvalent organic radical selected from the group consisting of alkyl, alkylene, alkenyl, cycloalkyl cycloalkylene, aryl, aralkyl, alkaryl, poly(oxyalkylene), poly-(carboalkoxyalkylene), and heterocyclic radicals both substituted and unsubstituted;

(d)

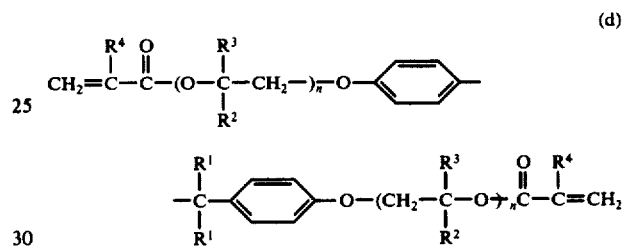

wherein $R^1$ is selected from the group consisiting of methyl, ethyl, carboxyl and hydrogen, $R^2$ is selected from the group consisting of hydrogen, methyl and ethyl; $R^3$ is selected from the group consisting of hydrogen, methyl and hydroxyl; $R^4$ is selected from the group consisting of hydrogen, chlorine, methyl and ethyl and n represents an integer of from 0 to 8; and (e) monofunctional acrylate and methacrylate esters and the hydroxy, amide, cyano, chloro, and silane substituted derivatives thereof;

and from 0.05 to 5.0%, by weight of monomer, of an alpha-hydroxy sulfone, the latter compound present in amount sufficient to initiate polymerization of said acrylic monomer at room temperature in the absence of air or oxygen.

2. The composition of claim 1 wherein the alpha-hydroxy sulfone corresponds to the formula:

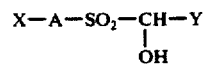

wherein A is an aliphatic or aromatic radical containing 1 to 18 carbon atoms; X is chosen from the group consisting of hydrogen, chlorine, fluorine, bromine, hydroxy, nitro, alkyl, alkoxy, aryloxy, carboalkoxy, and aryl; and Y is chosen from the group consisting of hydrogen, alkyl and aryl and may be substituted with a member of the group consisting of chlorine, bromine, fluorine, hydroxy, dialkyl amino and alkoxy.

3. The composition of claim 2 wherein the alphahydroxy sulfone is p-tolyl hydroxymethyl sulfone or phenyl hydroxymethyl sulfone.

4. The composition of claim 1 wherein the monomer is polymerizable hydroxyethyl acrylate.

5. The composition of claim 1 wherein the monomer is polymerizable hydroxypropyl methacrylate.

6. The composition of claim 1 wherein the monomer is the polymerizable reaction product of 2 moles of toluene diisocyanate, 1 mole of poly(propylene glycol) and 2 moles of hydroxyethyl acrylate.

7. The composition of claim 1 where there is additionally present in the composition 0.05 to 5.0% by weight of the monomer of ortho-sulfobenzimide.

8. An anaerobic curing composition stable when exposed to air consisting essentially of a mixture of a polymerizable acrylic or substituted acrylic monomer selected from the group consisting of (a)

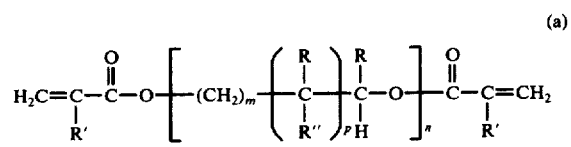

wherein R is selected from the group consisting of hydrogen, methyl, ethyl,

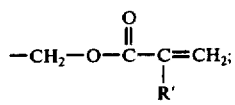

R' is selected from the group consisting of hydrogen, chlorine, methyl and ethyl;

R" is selected from the group consisting of hydrogen, hydroxy,

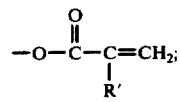

$m$ is an integer from 1 to 8; and $n$ is an integer from 1 to 20; and $p$ is 0 or 1;

(b)

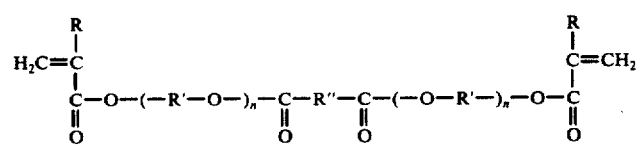

wherein
R represents hydrogen, chlorine, methyl or ethyl,
R' represents alkylene with 2-6 carbon atoms,
R" represents $(CH_2)_m$ in which $m$ is an integer of from 0 to 8,

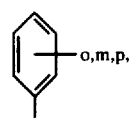

$n$ represents an integer of from 1 to 4;

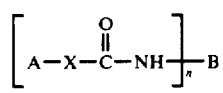

wherein X is selected from the group consisting of —O— and

and R is a member selected from the group consisting of hydrogen and lower alkyl of 1 to 7 carbon atoms, A represents the organic residue of an active hydrogen containing acrylic ester wherein the active hydrogen has been removed, said ester being hydroxy or amino substituted on the alkyl portion thereof, and the methyl, ethyl and chlorine homologs thereof, $n$ is an integer from 1 to 6, and B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted;

(d)

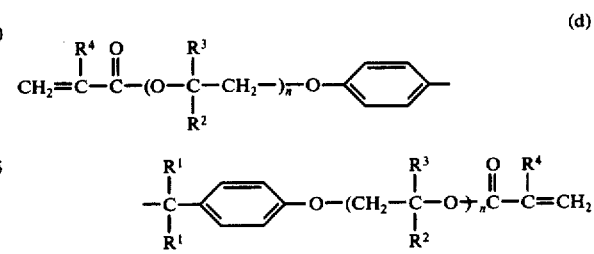

wherein $R^1$ is selected from the group consisting of methyl, ethyl, carboxyl and hydrogen, $R^2$ is selected from the group consisting of hydrogen, methyl and ethyl, $R^3$ is selected from the group consisting of hydrogen, methyl and hydroxyl; $R^4$ is selected from the group consisting of hydrogen, chlorine, methyl and ethyl and $n$ represents an integer of from 0 to 8; and (e) monofunctional acrylate and methacrylate esters and the hydroxy, amide, cyano, chloro, and silane substituted derivatives thereof;

from 0.05 to 5.0% by weight of monomer, of an alpha-hydroxy sulfone and from 0.1 to 10% by weight of the total formulation of a dialkyl peroxide, the alpha hydroxy sulfone present in amount sufficient to initiate polymerization of said acrylic monomer at room temperature in the absence of air or oxygen.

9. The composition of claim 8 wherein the alphahydroxy sulfone corresponds to the formula:

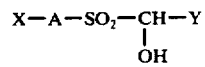

wherein A is an aliphatic or aromatic radical containing 1 to 18 carbon atoms; X is chosen from the group consisting of hydrogen, chlorine, fluorine, bromine, hydroxy, nitro, alkyl, alkoxy, aryloxy, carboalkoxy, and aryl; and Y is chosen from the group consisting of hydrogen, alkyl and aryl and may be substituted with a member of the group consisting of chlorine, bromine, fluorine, hydroxy, dialkyl amino and alkoxy.

10. The composition of claim 8 wherein the dialkyl peroxide is dicumylperoxide or di-t-butylperoxide.

11. The composition of claim 8 where there is additionally present in the composition 0.05 to 5.0% by weight of the monomer of ortho-sulfobenzimide.

12. A method of adhering closely facing surfaces which comprises interposing between said surfaces the composition of claim 1 and permitting said composition to cure in the absence of air or oxygen until said composition is set.

13. A method of adhering closely facing surfaces which comprises interposing between said surfaces the composition of claim 8 and permitting said composition to cure in the absence of air or oxygen until said composition is set.

* * * * *